(12) United States Patent
Latreille et al.

(10) Patent No.: US 7,040,008 B2
(45) Date of Patent: May 9, 2006

(54) DEVICE FOR CARRYING OUT MAINTENANCE WORK IN A REGION OF A PLANT DELIMITED BY A WALL HAVING AT LEAST TWO FACING SURFACES

(75) Inventors: Pascal Latreille, Saint Germain Du Plain (FR); Christophe Parize, Jambles (FR); Marc Gely, Fontaines (FR)

(73) Assignee: Framatome ANP, Courbevoie (FR)

( * ) Notice: Subject to any disclaimer, the term of this patent is extended or adjusted under 35 U.S.C. 154(b) by 456 days.

(21) Appl. No.: 10/394,173

(22) Filed: Mar. 24, 2003

(65) Prior Publication Data

US 2003/0227995 A1 Dec. 11, 2003

(30) Foreign Application Priority Data

Mar. 22, 2002 (FR) .................. 02 03636

(51) Int. Cl.
*B23P 19/00* (2006.01)
(52) U.S. Cl. .......................... 29/759; 29/706
(58) Field of Classification Search ............ 29/759, 29/706, 714, 721, 729, 760, 428, 464, 466, 29/402, 281.1; 376/463; 901/15
See application file for complete search history.

(56) References Cited

U.S. PATENT DOCUMENTS 4,654,702 A 3/1987 Tolino et al.
4,919,223 A 4/1990 Egger et al.
6,868,598 B1* 3/2005 Spittle et al. .................. 29/464
6,928,709 B1* 8/2005 McMillan et al. ......... 29/281.1

FOREIGN PATENT DOCUMENTS

| EP | 0461506 A1 | 12/1991 |
| FR | 2137703 | 12/1972 |
| FR | 2381657 | 9/1978 |

OTHER PUBLICATIONS

France Search Report, FA 616465 FR 0203636, Nov. 21, 2002, pp. 1-3.

* cited by examiner

*Primary Examiner*—John C. Hong
(74) *Attorney, Agent, or Firm*—Connolly Bove Lodge & Hutz LLP

(57) ABSTRACT

The maintenance device comprises a robot (2) for carrying out maintenance work in a remote-controlled or programmed way in the maintenance region. The robot (2) comprises a supporting part (2a) connected to a clamping support (3) secured to a means (4) of transporting the maintenance device (1) between an introductory region and the maintenance region. The clamping support (3) comprises clamping shoes (11, 13a, 13b) which can be moved in roughly parallel and opposite directions so as to clamp the maintenance device (1) in the maintenance region. The transport means (4) may be constructed in the form of a carriage comprising two motorized wheelsets. The device and the method of the invention make it possible in particular to carry out machining or inspection work inside primary pipes of a pressurized water nuclear reactor.

10 Claims, 9 Drawing Sheets

DEVICE FOR CARRYING OUT MAINTENANCE WORK IN A REGION OF A PLANT DELIMITED BY A WALL HAVING AT LEAST TWO FACING SURFACES

FIELD OF THE INVENTION

The invention relates to a device and to a method for carrying out maintenance work in a maintenance region of a plant delimited by at least one wall having at least two facing surfaces between which the maintenance work is performed.

BACKGROUND OF THE INVENTION

In certain cases, it is necessary to carry out maintenance work in regions of industrial plants which are not accessible to operators, particularly on account of the cramped size of the maintenance region and/or on account of there being an inhospitable environment in the maintenance region. This is the case, for example, of a plant comprising regions at high temperatures, at low pressure, or alternatively at high pressure or alternatively regions which are contaminated by radioactive substances or filled with a liquid or a gas which may be harmful.

In particular, in the case of nuclear reactor plants, certain maintenance operations have to be carried out in regions which are both cramped and contaminated.

For example, in the case of pressurized water nuclear reactors, maintenance operations have to be carried out in parts of the reactor which are in contact with the primary fluid of the reactor while it is operating. Such parts of the reactor are generally highly contaminated and somewhat inaccessible, within the primary circuit, or alternatively within the reactor cavity, during maintenance operations for inspection and repair.

For example, when the nuclear reactor is shut down, inspection and repair operations are generally performed on the pressurized water reactor internals, the upper internals arranged above the core being set down in the reactor cavity to give access to the upper part of the core. The nuclear reactor upper internals are set down on a stand in the bottom of the reactor cavity, the horizontal underside of the internals being a small distance above the bottom of the cavity. Certain maintenance operations, for example for repair or inspection, need to involve means which are brought in under the surface of the internals, in a maintenance region which may be distant from the peripheral part of the lower internals. In this case, use is generally made of a remote-controlled carriage which is reserved for certain specific tasks under the upper internals.

In the case of maintenance work on the primary circuit itself, for example in the case of an operation replacing a section of primary pipe, such a method being the subject of a patent application filed on the same day as this application, it may be necessary to have a means of performing maintenance work inside a primary pipe which is accessible only from an introductory region consisting of an internal part of a component such as a primary pump or the nuclear reactor vessel. Such maintenance work inside a primary pipe of the nuclear reactor may prove necessary in order to grind down the internal part of a weld connecting a replacement section of primary pipe or to carry out various checks on the internal part of the weld.

In the case of nuclear reactors of a different type from pressurized water reactors and, in particular, in the case of nuclear reactors of the graphite-gas variety, it may be necessary, in the case of operations for dismantling these reactors, to operate in a region of short height between the set of guide tubes and the core of the nuclear reactor.

Hitherto there have been no known means for carrying out remote-controlled maintenance work in a cramped region which can be suited to various uses and which can carry out complex operations.

Maintenance devices used to carry out specific operations inside pipes are known. Such devices are used only inside pipes of a well-defined diameter or of a diameter varying within a narrow range around a mean value and for special purpose maintenance operations for which the tool was designed.

Also known, from patent FR-2 780 907 by the company FRAMATOME, is a remote-controlled multipurpose maintenance method and device for carrying out maintenance on an industrial plant such as a nuclear reactor. Such an installation comprises a robot arm of standard type comprising a supporting part and moving parts which can move with respect to the supporting part allowing movements in very varied paths, for example to pick up successive tools from a tool holder and the use of these tools in a maintenance operation of complex type, for example a dye-penetration inspection of a bimetallic weld between two nuclear reactor pipes. The robot is preferably a robot arm of anthropomorphic type having, for example, five or six axes for the motorized rotational movement of articulated elements of the robot. The robot may be fixed to the pipes that are to be inspected, using a clamping collar.

Such a method and such a device are not suited to maintenance operations in a region between two walls which are separated by a short distance or inside a pipe of any arbitrary diameter.

BRIEF DESCRIPTION OF THE INVENTION

The object of the invention is therefore to provide a maintenance device for working in a maintenance region of a plant delimited by at least one wall having at least two facing surfaces between which the maintenance work is performed and which is accessible from an introductory region of the plant, comprising a robot for carrying out the maintenance work in a remote-controlled or programmed way and an immobilizing device for immobilizing a supporting part of the robot in the work position in the installation, this device making it possible to carry out maintenance work of very varied types, controlled remotely, in regions which are inaccessible to an operator, for example on account of the cramped nature of the maintenance region or of the presence of an inhospitable environment.

To this end, the maintenance device according to the invention additionally comprises a motorized and remote-controlled transport means and the device for immobilizing the supporting part of the robot is a clamping support secured to the transport means, comprising at least two clamping shoes associated with movement means, each in at least one direction so as to move the shoe away from the clamping support, the movements of the two clamping shoes being performed in parallel and opposite directions, and removable means of fixing the supporting part of the robot on the clamping support secured to the motorized transport means.

The invention also relates to a method for carrying out maintenance work in a region of a plant delimited by at least one wall having at least two facing surfaces between which the maintenance work is carried out and which is accessible from an introductory region of the plant, characterized:

in that use is made of a remote-controlled robot comprising a supporting part and at least one moving part that can move with respect to the supporting part, in that the supporting part of the robot is fixed to a support secured to a remote-controlled motorized transport means, in that an assembly consisting of the robot, the support and the transport means is placed in the introductory region of the plant, in a position for accessing the maintenance region, in that the motorized transport means bearing the support and the robot is moved by remote control of the motorized means, between the introductory region and the maintenance region, in that the transport means is stopped in the maintenance region, in that the clamping means of the support are operated remotely between two bearing surfaces in the maintenance region, and in that at least the start of the maintenance work in the maintenance region is initiated using at least one moving part of the robot.

In order to make the invention easy to understand, a maintenance device according to the invention and its use for carrying out grinding-down and dye-penetration inspection operations in a primary pipe of a pressurized water reactor using the method of the invention will now be described.

DETAILED DESCRIPTION OF THE INVENTION

Figure 1:
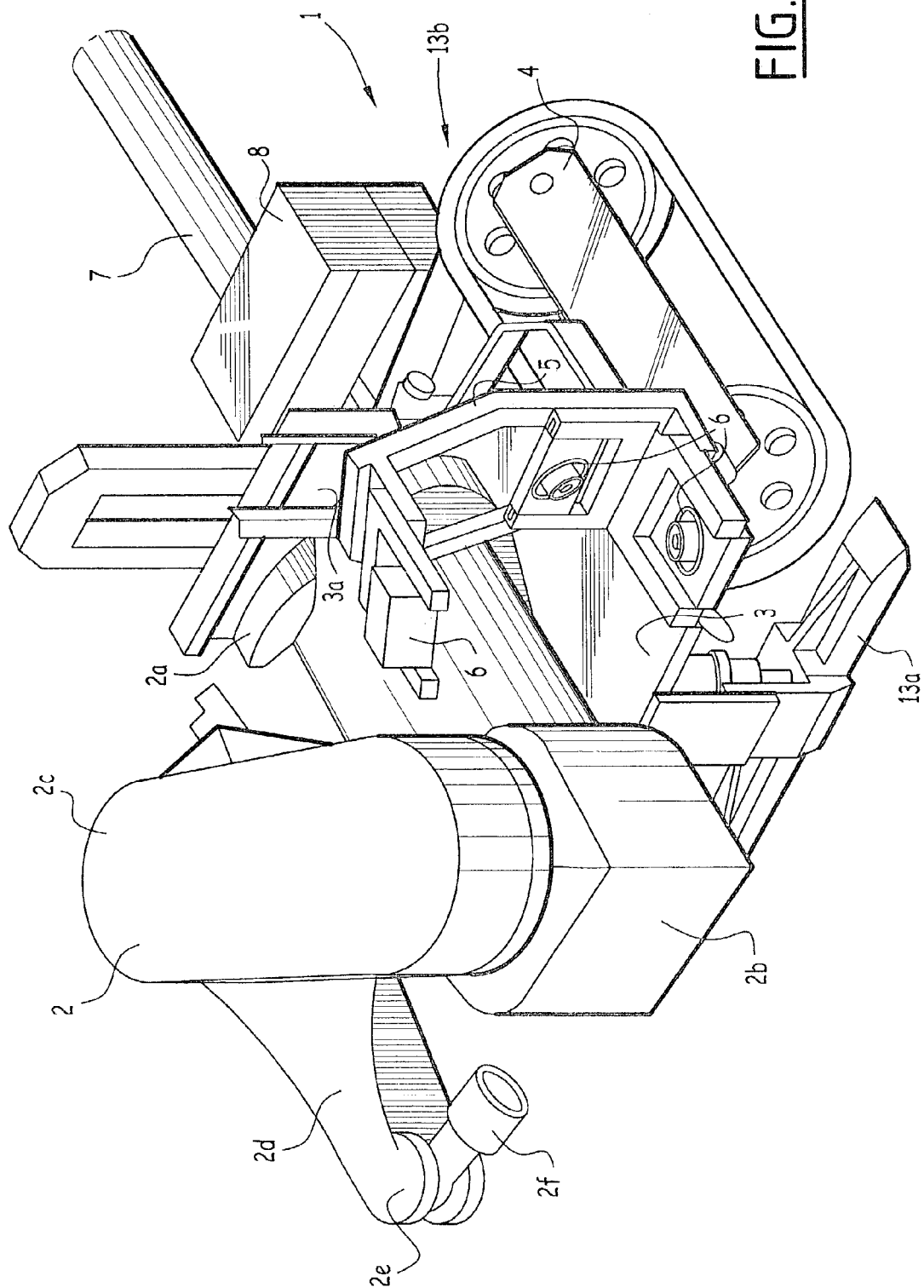
FIG. 1 is an overall perspective view of a maintenance device according to the invention.

FIG. 1 shows a maintenance device according to the invention denoted overall by the reference 1 and which mainly comprises a robot arm 2, a clamping support 3 and a transport carriage 4.

The robot arm 2 comprises a supporting part 2a and a set of moving elements 2b, 2c, 2d, 2e and 2f which are connected to one another in an articulated way or are mounted so as rotate with respect to the supporting part which is connected fixedly to the clamping support 3 secured to the carriage 4.

The various constituent elements of the robot arm 2 comprise motorized means so that they can move one with respect to the other in terms of rotation when the motorized means are made to actuate the robot arm 2. The robot arm 2, of a standard type, comprises six motorized axles and an end part 2f by means of which tools 6 on a tool holder 5 fixed to the support 3 secured to the carriage in a lateral position can be picked up.

The movements of the robot arm 2, in rotation or relative pivoting of its various successive parts, first of all allow the end part 2f of the robot arm to engage on a corresponding assembly part 6 of a tool placed on the tool holder 5. In the embodiment depicted, the tool holder is bolted onto a part 3a of the support 3 by means of which the supporting part 2a of the robot arm 2 is also quickly secured.

The movements of the robot arm allow the end part 2f of the robot arm to engage in a corresponding engagement part of a tool plate 6 and the tool plate 6 to be locked onto the end 2f of the robot arm 2.

Engagement of the coupling of the end part 2f of the robot arm in the tool plate 6 also allows means supplying the tool with electric power and/or hydraulic fluid for actuating it to be connected.

The movements of the robot arm also allow the tool to move with respect to a surface on which the maintenance operation is being performed, for example in terms of rotation or in terms of translation.

The motorized devices which move the robot arm and the motorized tools are supplied with electric power and controlled by a set of cables 7 which is connected to the chassis 3 secured to the carriage 4 and which accompanies the movements of the carriage between the introductory region and the maintenance region. Each of the cables or supply pipes of the assembly 7 is connected to the robot arm or to means of driving of the motorized carriage 4 or means of clamping of the support 3 which will be described later.

Fixed to the rear part of the carriage 6 is a counter-weight 8 for balancing the weight of the robot arm 2 mounted at the font of the maintenance device 1 while the carriage is moving.

Figure 2:
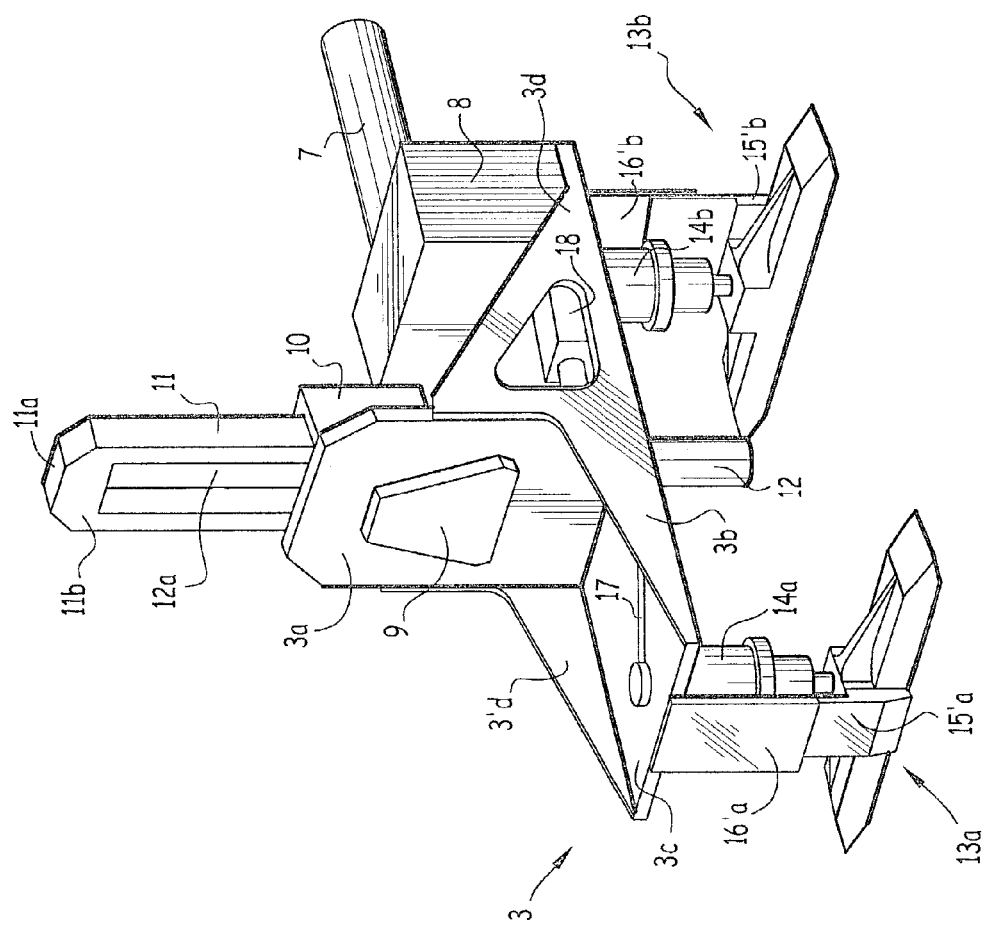
FIG. 2 is a perspective view of a clamping support of the device depicted in FIG. 1.

FIG. 2 depicts the clamping support 3 which, when assembled with the maintenance device as depicted in FIG. 1, is secured to the transport carriage 4.

The clamping support 3 comprises a rigid mechanical structure 3b itself comprising a flat support plate 3c and two angle brackets 3d and 3'd perpendicular to the support plate 3c. Between the angle brackets 3d and 3'd is fixed, in an arrangement perpendicular to the support plate 3c, the element 3a in the form of a thick plate bearing, on a front face, a means 9 for the quick-fit attachment of the supporting element 2a of the robot arm 2 with, for example, a trapezoidal shape intended to engage in a corresponding opening of the supporting element of the robot arm.

Fixed to the rear face of the plate-shaped element 3a is an element 10 for guidance in the vertical direction of a clamping shoe 11 of the clamping chassis 3. The clamping shoe 11 comprises, at its end, a bearing part 11a and an elongate body 11b in the shape of a U connected, at its end part corresponding to the branch of the U, to the rod 12a (placed between the branches of the U) of an actuating ram 12, the body of which is fixed to the clamping chassis 3 below the support plate 3c. The ram 12 makes it possible to move the clamping shoe 11 in a direction perpendicular to the support plate 3c. Fixed to the support plate 3c are also, on the opposite face to the face that bears the device 10 for guiding the clamping shoe 11, two bearing shoes 13a and 13b which are actuated by respective rams 14a and 14b to move them in a direction perpendicular to the plate 3c and therefore parallel to the direction of travel of the clamping ram 11 guided by the guide device 10.

The shoes 13a and 13b are each secured to the rod of the corresponding ram 14a or 14b and comprise a respective guide plate 15'a (or 15'b) intended to move by sliding over a fixed plate 16'a (or 16'b) fixed to the support plate 3c in an arrangement perpendicular to the support plate 3c.

The rams 12, 14a and 14b of the clamping and bearing shoes are supplied with hydraulic fluid by pipes such as 17, from a hydraulic directional control unit 18 arranged to the rear of the clamping chassis 3.

The bearing shoe 13a is placed at the front of the clamping chassis 3 and the second bearing shoe 13b is placed on a rear part of the clamping chassis 3 to which the counterweight 8 is also fixed.

Supplying the rams 12, 14a and 14b with hydraulic fluid allows the shoes to be moved outwards, that is to say away from the clamping chassis 3, in directions which are mutually parallel and are perpendicular to the support plate 3c and in different directional senses.

Figure 3:
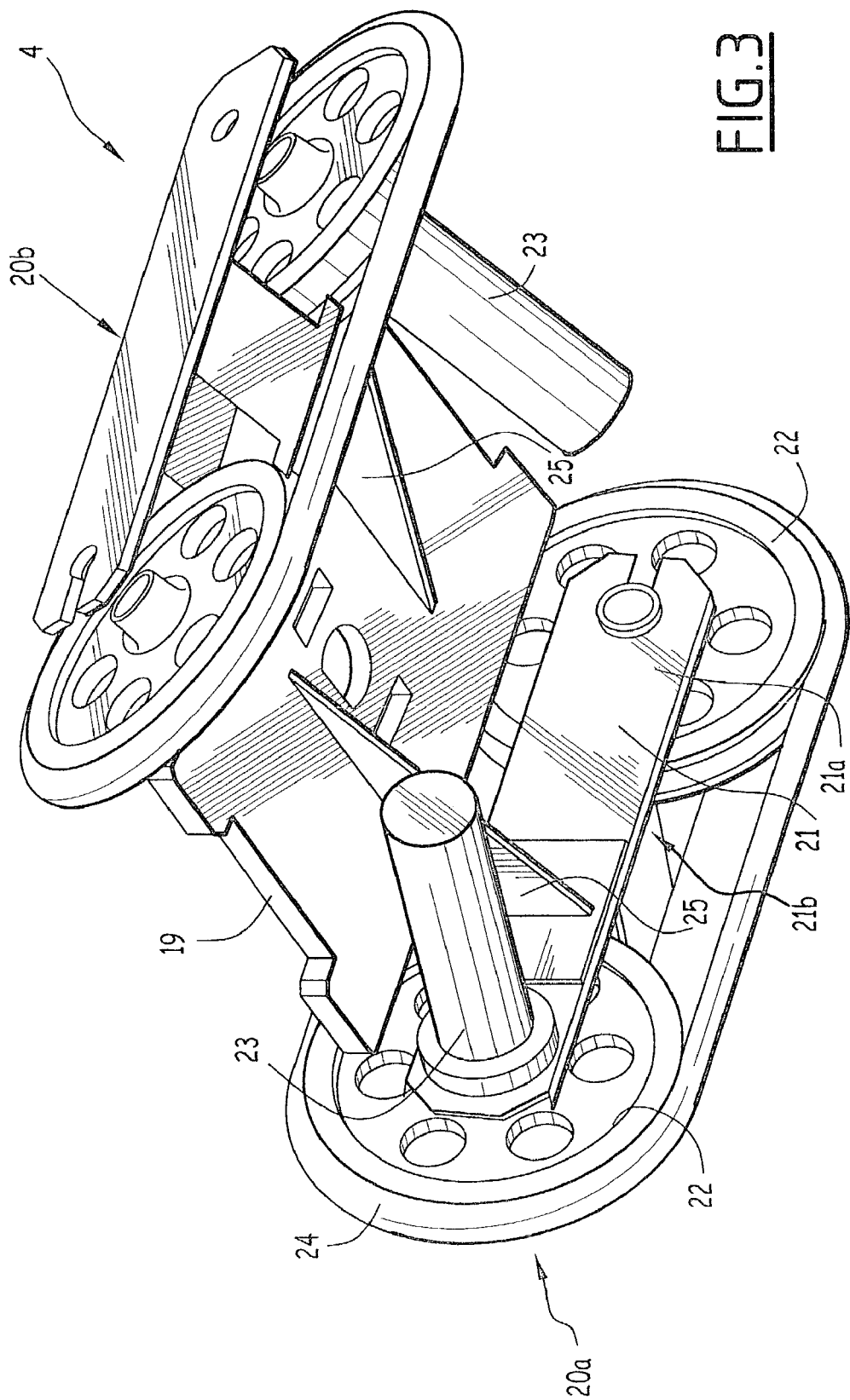
FIG. 3 is a three-quarters perspective view from beneath of the means of transporting the maintenance device.

FIG. 3 depicts the carriage 4 that constitutes the means of transporting the robot 2 from the introductory region to the maintenance region of a plant in which the maintenance work is performed.

The carriage 4 comprises a support plate 19 pierced with holes allowing the clamping support 3 to be fixed to the carriage 4, the support plate 3c of the clamping support 3 being connected and fixed to the support plate 19 of the carriage, for example by nuts and bolts.

The carriage 4 additionally comprises two wheelsets 20a and 20b mounted on each side of two lateral sides of the support plate 19, in the longitudinal direction of the carriage 4.

Each of the wheelsets such as 20a and 20b comprises a mechanical structure 21 providing the rotary mounting of two wheels 22 via rotation axles mounted to rotate in openings of the mechanical structure 21. The mechanical structure 21 itself consists of two mutually parallel plates 21a and 21b placed on each side of the wheels 22 and joined together by mechanical means with the insertion of a spacer piece. The mechanical structure 11 allows the wheels 22 of a wheelset such as 20a and 20b to be mounted with rotation and held apart. The mechanical structure comprises an inner plate 21a directed towards the inside of the carriage facing the corresponding inner plate of the second wheelset and an outer plate 21b facing towards the outside of the carriage.

On the inner plate 21a of each of the wheelsets is mounted a motor 23 for the rotational driving of one of the wheels of the wheelset.

The wheels 22 comprise a peripheral groove in which a round-section belt 24, generally made of rubber, is engaged, the belt 24 being engaged over the peripheral parts of the two wheels 22 of a wheelset. The peripheral parts of the wheelsets may also have independent round-section tread strips, preferably made of rubber or plastic.

The mechanical structures 21 of the wheelsets 20a and 20b are fixed to the support plate 19 via angle brackets 25. It is possible to conceive of a welded mechanical construction, the angle brackets being welded to the support plate 19 and the inner plates 21a of the mechanical structures 21 or a mechanical structure allowing the spacing and inclination of the wheelsets with respect to the plane of the support plate 19 to be adjusted.

In the case of the carriage 4 depicted in FIG. 3, the wheelsets are inclined towards the outside from top to bottom, so as to effectively keep and guide the carriage inside a pipe. The plates 21a and 21b of the mechanical structures 21 are inclined towards the outside with respect to a plane perpendicular to the support plate 19.

The independent drive of the two wheelsets 20a and 20b via the motors 23 which can be controlled independently of one another allows the carriage to be oriented, as it moves along a flat surface or in a pipe which is not straight.

The drive motor 23 for a first wheelset 20a drives the front wheel of the first wheelset, while the second motor 23 of the second wheelset 20b drives the rear wheel of the second wheelset. It is thus possible to steer the carriage by controlling each of the two drive motors.

FIGS. 4A, 4B, 4C and 4D depict four different tools which can be used in an operation inside a pipe of the primary circuit of a nuclear reactor in which a section of pipe has been replaced.

Figure 4A:
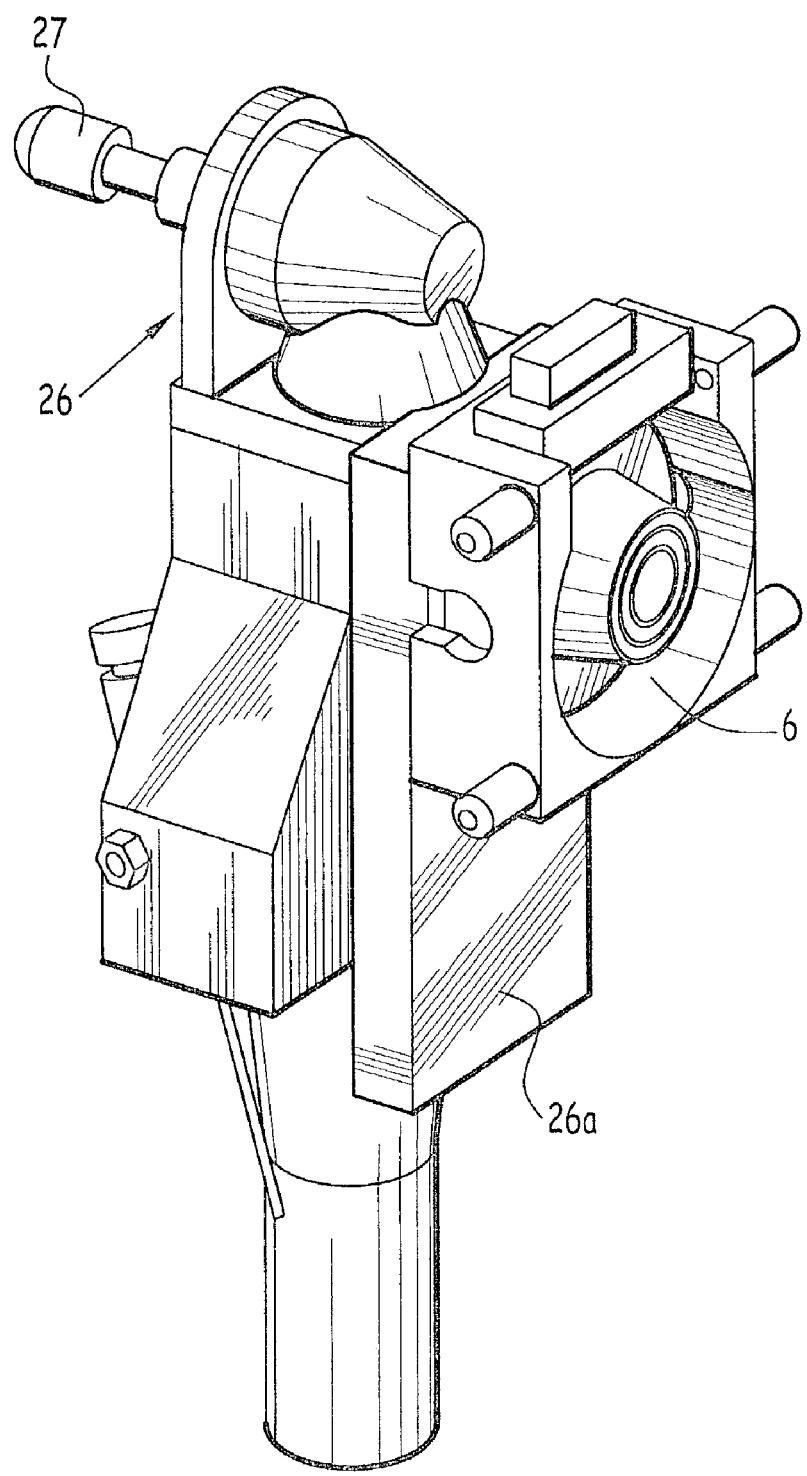
FIGS. 4A, 4B, 4C, 4D and 4E are perspective views of various tools that can be used by the robot of the maintenance device.
Figure 4B:
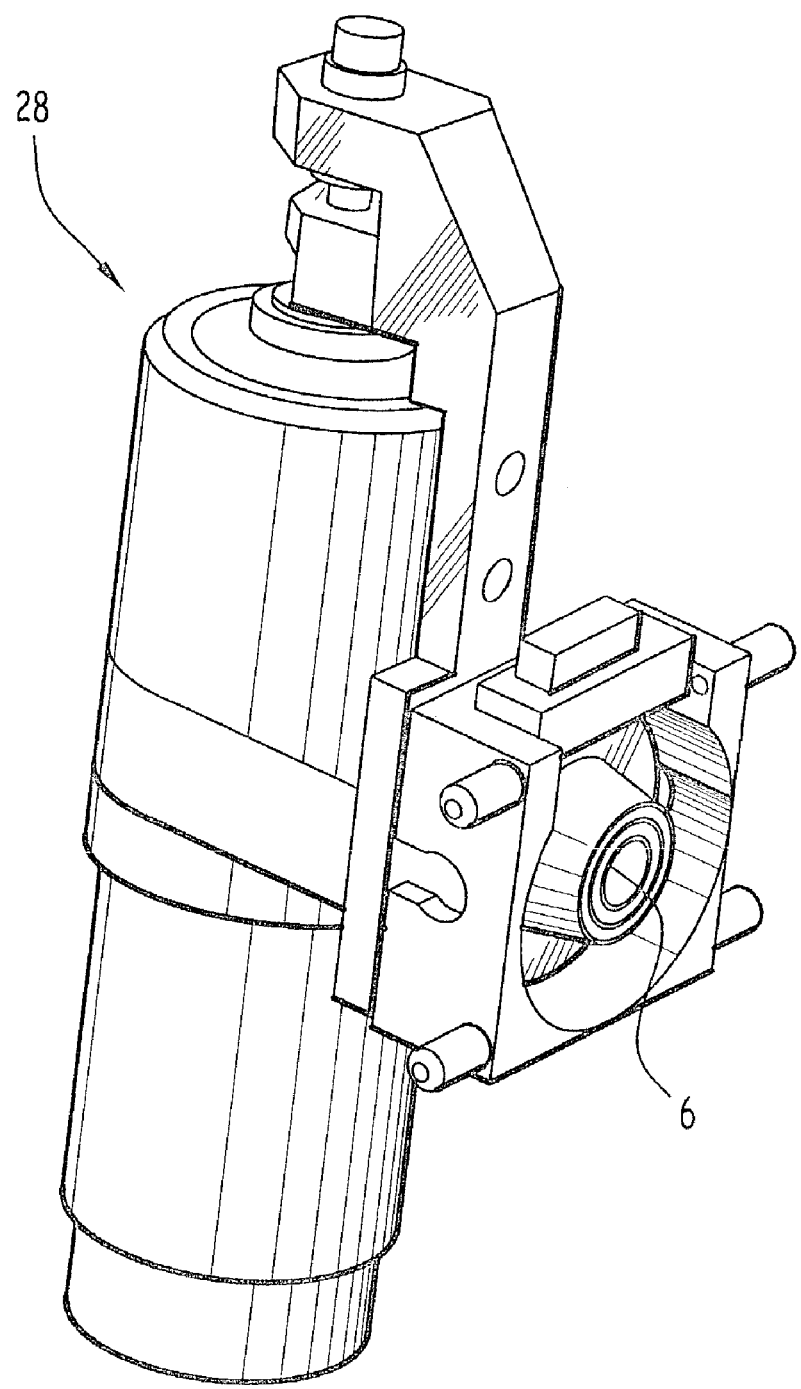
Figure 4C:
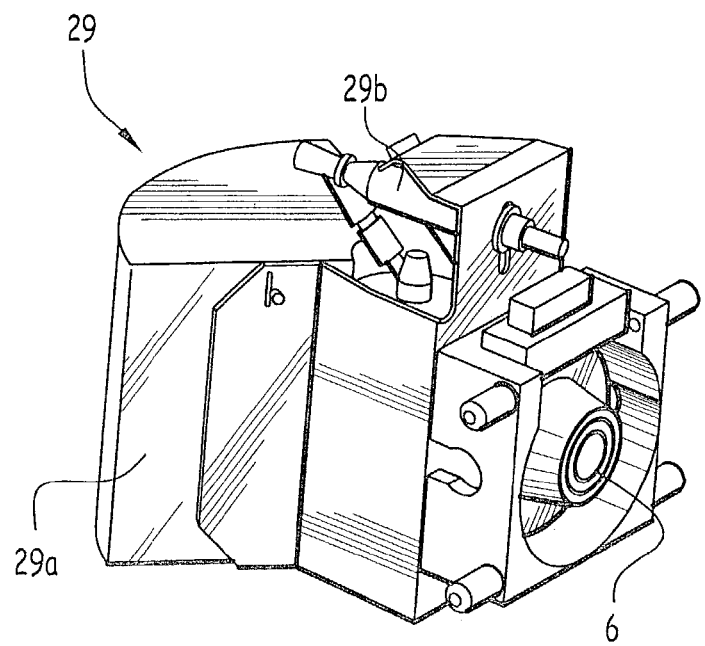
Figure 4D:
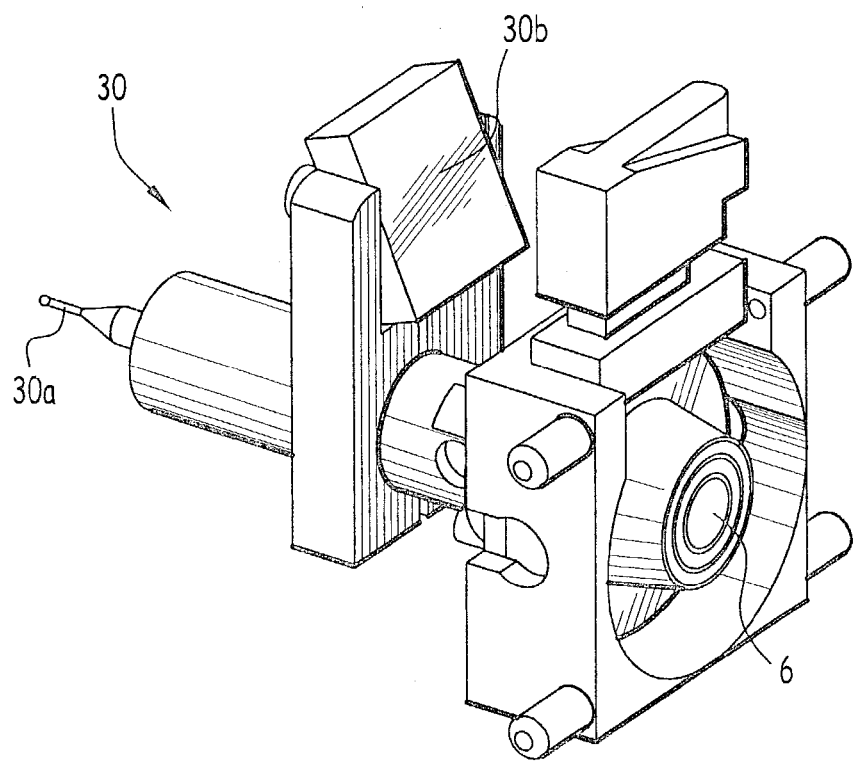
Figure 4E:
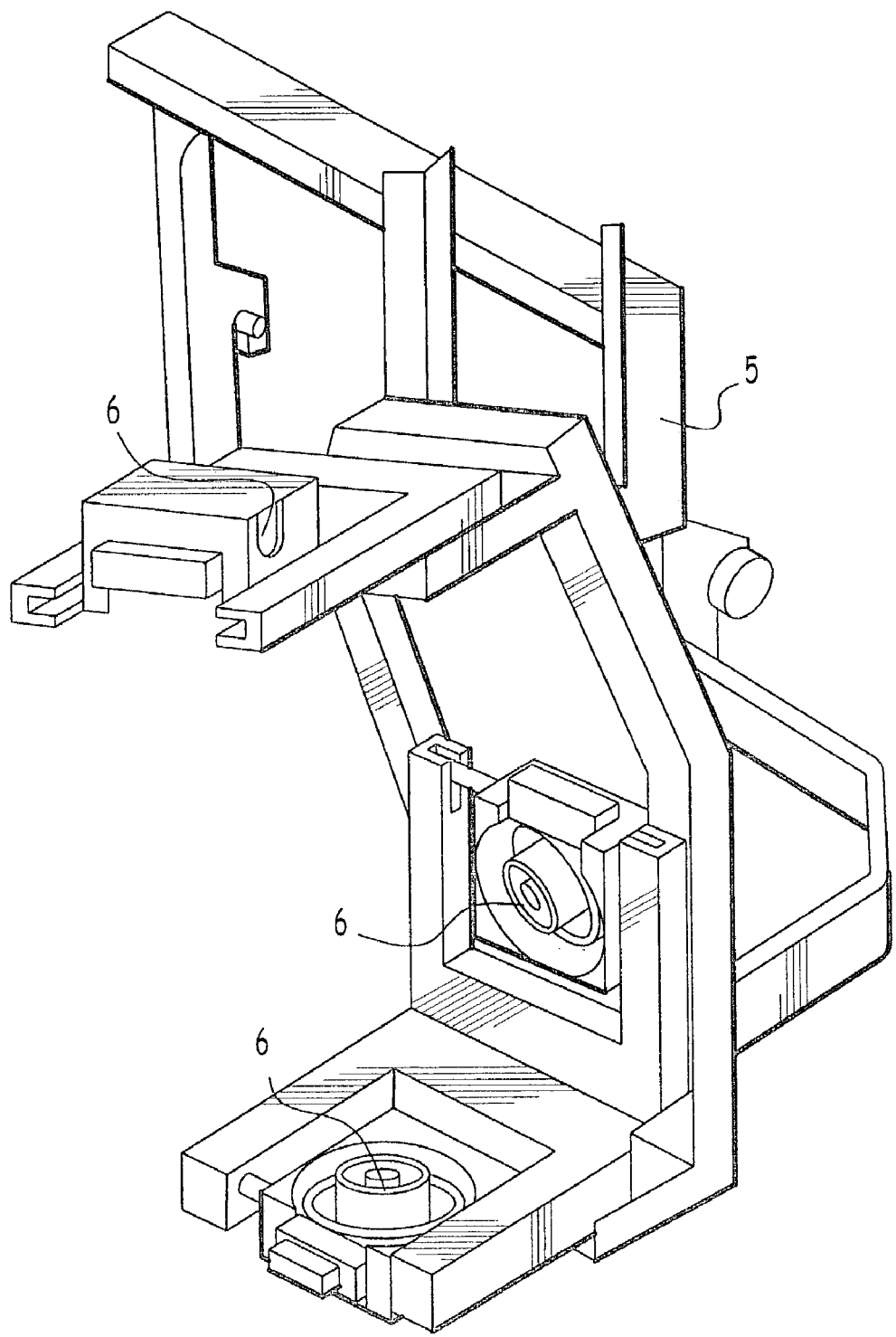

FIG. 4E depicts the tool support 5 on which the tools needed for an operation inside the pipe are fixed via support and mounting plates 6.

FIG. 4A depicts a tool 26 which can be used for machining an internal surface of a weld connecting a replacement section into a primary pipe of a pressurized water reactor.

The tool 26 comprises a fixing plate 26a on a standard mounting plate 6 which can be placed in a standby position on the tool support 5. Fixed to the support plate 26a are a motor for driving the tool and a protective casing.

The tool 27 consists of a milling cutter mounted so that it can rotate on a front face of the casing and driven by a bevel gear in engagement with gearing of a gear set driven by the motor of the tool 26.

The tool 28 depicted in FIG. 4B is an aerosol canister secured to a standard support plate 6 and containing a penetrating fluid or a disclosing fluid used in a dye-penetration operation. The aerosol canister is connected to control means allowing the remote spraying of a surface which is being inspected using a dye-penetration technique.

The tool 29, depicted in FIG. 4C, is a sponge 29a associated with a water atomizer 29b used in an operation of cleaning a surface that is to be inspected by dye-penetration inspection.

FIG. 4D depicts a tool 30 fixed to a support mounting plate 6 and comprising a feeler 30a and a camera 30b for checking the profile of a machined surface, for example inside a primary pipe. The tool could just as easily be a welding tool such as a TIG welding torch.

Figure 5:
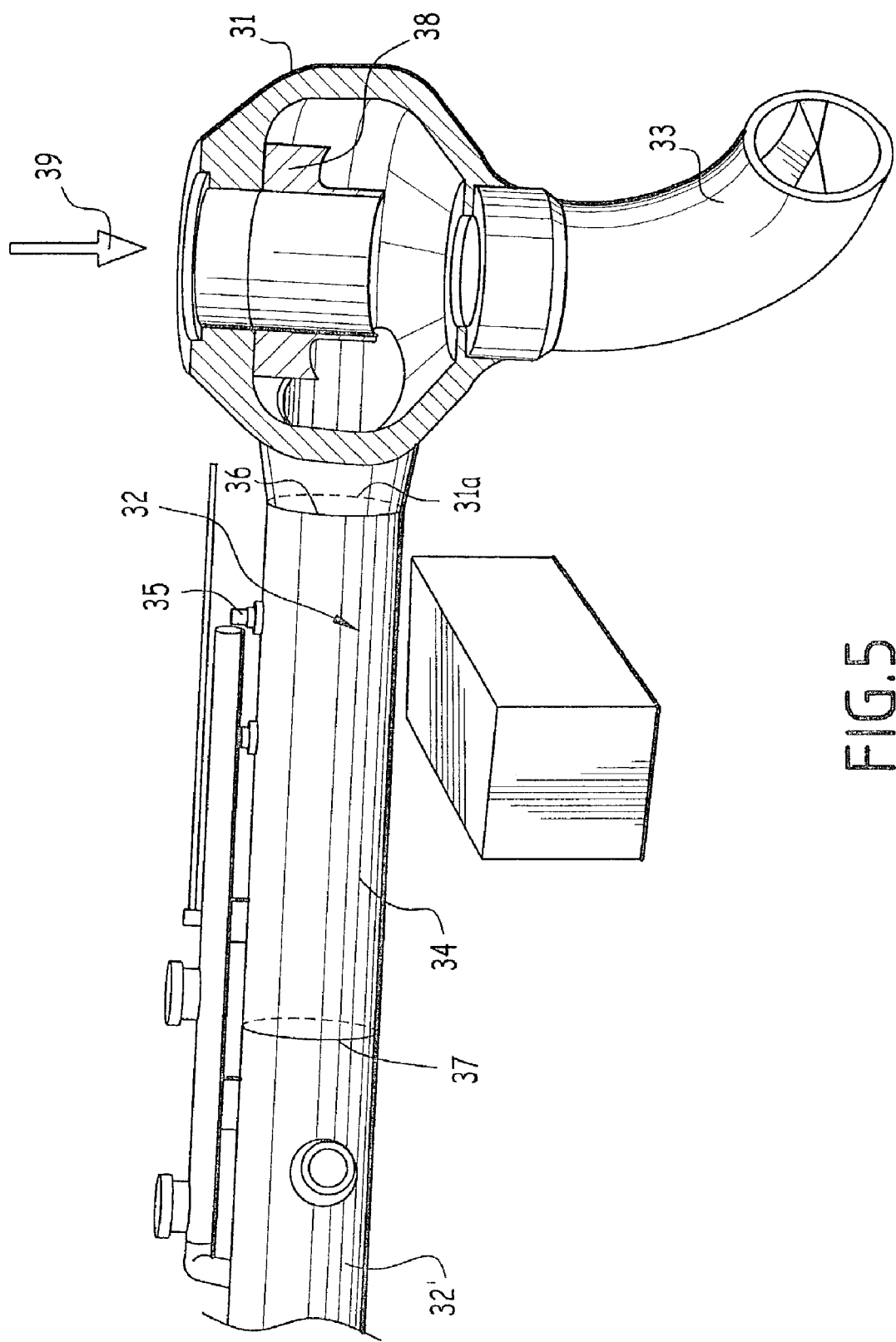
FIG. 5 is an exploded perspective view of part of a primary circuit of a pressurized water reactor in which a maintenance operation is performed using the method of the invention.

FIG. 5 depicts part of a loop of the primary circuit of a nuclear reactor comprising a housing 31 of a primary pump, a cold leg 32 connecting an outlet nozzle 31a of the housing 31 of the primary pump to the nuclear reactor vessel, and part of a U-shaped leg 33 connecting an intake part of the housing 31 of the primary pump to a steam generator, not depicted.

A section 34 of the cold leg 32, between the outlet nozzle 31a of the primary pump and a remaining part 32' of the primary leg on the nuclear reactor vessel side will have been replaced beforehand, for example using the method described in the patent application filed on the same day as this application.

The method consists in cutting through a section of the cold leg 32 that is to be replaced and comprising a tapping 35 for connecting the cold leg to an injection pipe of a chemical and volume control system (RCV circuit) of the reactor. What happens is that after a certain running time, defects known as "crazing" can be seen on the internal surface of the cold leg 32 of nuclear reactors near the tapping for connecting to the RCV circuit.

Having cut through the section that is to be replaced, a new section 34 is fitted and is connected to the outlet nozzle 31a of the housing 31 of the primary pipe using a first welded joint 36 and to the remaining part 32' of the primary pipe connected to the vessel by a second welded joint 37. The welded joints 36 and 37 are generally performed by depositing metal in a narrow chamfer, that is to say a chamfer whose width in the axial direction is generally smaller than 15 mm and which has chamfered surfaces on each of the parts that are to be connected which are placed facing each other making a very small angle between them.

Having partially welded the replacement section 34 to the nozzle 31a and to the remaining part 32' of the primary leg, by partially filling the weld chamfer in its part situated towards the inside of the pipe, the internal part of the weld needs to be ground down or levelled from inside the primary pipe 32 in order to obtain a perfect weld.

The operation of levelling the internal part of the weld needs to be followed by a dye-penetration inspection operation and possibly by re-machining of regions which may exhibit defects and refilling of the re-machined regions.

These operations from inside the pipe 32 may be carried out using the maintenance method and device according to the invention.

For that, as depicted in FIG. 5, the upper part of the primary pump comprising the pump drive motor and the sealed passage of the pump shaft and pump impeller situated in the housing is removed, the pump diffuser 38 remaining in situ.

As indicated by the arrow 39, a lift mounted above the horizontal upper joining plane of the housing 31 is used to introduce a maintenance device according to the invention as depicted in FIG. 1 carried by a transport platform.

By using the lift and means of moving this lift in the horizontal plane, the maintenance device 1, in a single part or in two successive parts which are assembled inside the housing 31, depending on the relative size of the vertical opening inside the diffuser 38 and of the maintenance device, is placed at the inlet to the outlet nozzle 31a or on a passage extending the lower surface of the nozzle inside the housing 31.

When the maintenance device is introduced into the outlet nozzle 31a constituting the inlet part of the two-part cold leg 32, the robot arm 2 carried by a carriage is first of all lowered into the housing 31, then the robot arm is placed in the inlet part of the outlet nozzle 31a, using the carriage.

Next, the lift is used to lower the carriage to which the clamping chassis is fixed down inside the housing 31.

An operator goes down inside the housing 31 to assemble the robot arm with the clamping support, assembly being performed by engaging the two parts of the quick-fit connecting device of the robot with the clamping support. The operator then engages the carriage secured to the clamping support bearing the robot arm in the outlet nozzle of the housing 31 of the primary pump.

The operation of assembling the robot arm and the clamping support using the quick-fit connecting device is performed in a very short space of time, the operator tasked with this assembly and with placing the carriage at the inlet of the cold leg 32 remaining inside the pump housing 31 for a period of the order of just thirty seconds.

The cables connected to the clamping chassis borne by the carriage are then used to remotely control the movement of the carriage inside the primary pipe, under the effect of the drive motors 23.

The movement which is monitored by operators on a screen which receives images from a camera carried by the clamping support is stopped when the carriage has reached the maintenance region, for example at the weld region 37. The rams of the bearing shoes 13a, 13b and of the clamping shoe 11 are then fed until the downwardly directed bearing shoes 13a, 13b bear against the lower part of the internal surface of the primary pipe and the rams of the upwardly directed clamping shoe 11 are fed until it comes to bear on the upper part of the internal surface of the primary pipe 32.

The maintenance device is clamped in position by the shoes 13a, 13b and 11 bearing on facing surfaces of the internal wall of the primary pipe 32, near the weld region 37.

The robot arm is then remotely controlled, for example to begin a programmed or remote-operated operation such as the levelling of the internal surface of the weld 37 of the replacement section 34 to the remaining part 32' of the primary leg.

The machining operation is generally performed by grinding down the internal part of the weld, in an entirely programmed way, through successive passes, the end 2f of the robot arm carrying the tool 26 depicted in FIG. 4A.

When the grinding-down has been completed, the profile of the ground-down surface is inspected using the tool 30 depicted in FIG. 4D. For that, the robot arm is moved in such a way as to put the tool 26 down on the tool support 5 and the end element 2f of the robot arm is actuated to make it release the support plate 6 of the tool 26.

The robot arm then goes and picks up the tool 30, via its support plate 6.

Having inspected the ground-down surface, if the surface profile is satisfactory, then the machined surface is inspected by dye-penetration inspection.

First of all, the ground-down surface is cleaned, then a penetrant is applied to this surface using the tool 28. The excess penetrant in the maintenance region is removed using the tool 29 then the maintenance region is inspected televisually to check that the excess penetrant has been removed. A discloser is then applied to the surface that is to be inspected, using the tool 28. Finally, the maintenance region is inspected televisually to determine whether any faults are present.

If faults are present, then machining can be carried out by excavating the regions which have defects, using a milling tool such as the tool 26. The excavated regions are then refilled using the tool consisting of the TIG welding torch, mounted on the end part of the robot arm.

A further dye-penetration inspection is then performed. When a surface completely free of faults is obtained, the rams of the clamping support are made to retract then the carriage is moved under motorization to return the maintenance device to the inlet to the cold leg, in the outlet nozzle 31 of the pump housing 31.

The two-part maintenance device is then extracted using the lift introduced into the housing.

Figure 6:
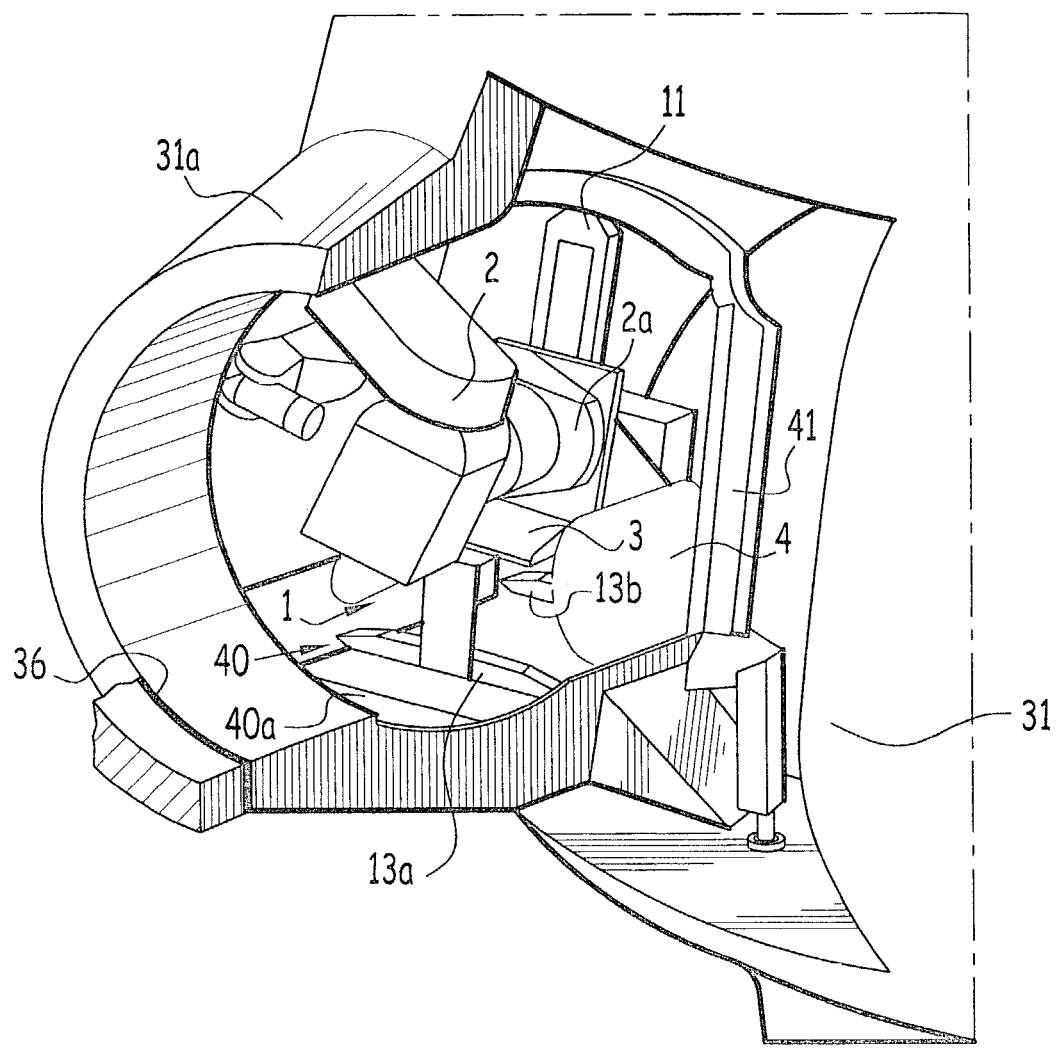
FIG. 6 is a perspective view with cutaway of the maintenance device held in the service position by a support and a positioning hoop.

As can be seen in FIG. 6, maintenance work similar to that carried out in the weld region 37 can be performed in the weld region 36 between the nozzle 31a and the section 34 without turning the maintenance device 1 round. To do that, a support 40 resting on the lower surface of the inlet part of the nozzle 31 and resting via supporting legs on the bottom of the housing 31 is placed inside the pump housing 31 near the inlet to the nozzle 31a. A positioning hoop 41 is also fixed to the support 40 at the supporting legs and above the part of the support 40 situated on the inside of the housing 31. The support 40 comprises a cylindrical part which hugs the internal surface of the nozzle 31a and a flat floor 40a resting on the cylindrical part of the support. To carry out the maintenance work, the carriage 4 of the maintenance device 1 is moved, for example, from the region of the weld 37 until it is in place on the support 40; the wheels of the carriage 4 are then in contact with the cylindrical part of the support 40. The bearing shoes 13a and 13b of the clamping device 3 are actuated and come to bear against the floor 40a and the clamping shoe 11 is actuated and comes to bear against the upper part of the positioning hoop 41, the position of the device being set to ensure that the clamping shoe 11 and the positioning hoop 41 face each other. The device 1 is thus held in the work position and can carry out maintenance work in the region of the weld 36 as described previously in respect of the region of the weld 37 inside the pipe.

In general, the maintenance device can be clamped between the two facing surfaces of the wall of the plant or between two surfaces attached to the plant, such as a surface of a support or a hoop or between two surfaces at least one of which is attached to the plant.

Instead of introducing the maintenance device into the inlet part of the primary leg via the housing of the primary pump, it is possible to introduce the maintenance device via the opposite end part of the primary leg, from inside the nuclear reactor vessel. In this case, it is possible to introduce the maintenance device into the cold leg in a single piece. The maintenance device is moved, by virtue of the carriage, until it is placed in the maintenance region, inside the cold leg, for example in the region of the weld 37. The operations of machining and of inspecting the internal part of the weld 37 are carried out as described previously.

When the maintenance device is introduced via a nozzle of the reactor vessel at the outlet of the cold leg, it is possible for tools to be supplied to the tool loader either from the edge of the reactor cavity, using handling poles, or by lowering into the vessel an operator wearing a biological protection suit.

It is also possible, as in the case when the maintenance device is introduced into the housing of the primary pump, for the tools to be supplied automatically using a tool support or tool rack 5 on the clamping support or on the lifting plate of a lift used for placing the handling device in a nozzle of the vessel.

When passage is via the vessel nozzles, the maintenance device has to negotiate curved parts, which can be done by virtue of the independent motorization of the two wheelsets of the carriage 4.

The maintenance device according to the invention can be used not only for carrying out rectification operations by grinding down and inspecting the internal surfaces of welds in the primary pipe but also, in the event that crazing has been identified in the part of the primary pipe near the RCV circuit tapping 35, for excavating the crazed regions and refilling these regions using the TIG welding tool, the excavating and welding operations being performed by virtue of the maintenance device, from inside the primary pipe.

The invention is not restricted to the embodiments which have been described.

In general, the device according to the invention can be used to carry out any machining operation such as grinding or polishing the interior part of a pipeline and the welding and non-destructive testing operations performed on the internal surfaces of pipelines.

In the case of a primary pipe, the support plate of the robot arm is generally horizontal as the carriage moves and during maintenance. It is possible to control the lateral inclination of the carriage as it moves and at the time of clamping the maintenance device, using an inclinometer connected by a measurement cable to a control post. It is, however, possible to use the robot arm with its support oriented in any way.

In any event, the robot arm comprises quick-fit connecting means for connecting to the clamping support secured to the carriage of the maintenance device, which means that it is possible for the clamping support and the carriage to be equipped with robot arms of different types in succession.

In the case of maintenance work inside a nuclear reactor primary pipe, the maintenance device can be introduced into an inlet part of the primary pipe from the reactor vessel or from a component other than the primary pump. For example, the maintenance device can be introduced into the water box of a steam generator through a manhole so as to be placed in an end nozzle of the U-shaped leg or hot leg of the primary circuit. It is thus possible to carry out maintenance work in all the primary pipes of the nuclear reactor.

In any event, the movement of the maintenance device inside the primary pipe, from the introductory region to the maintenance region, is performed by the remote-controlled motorized carriage.

Having, by remote control, clamped the maintenance device in position, maintenance can be carried out in the maintenance region by remote control, either by remote operation or in a programmed way or using a method combining remote control and the execution of programmed tasks.

The invention is not restricted to maintenance operations in pipes, it being possible also for the method and the device according to the invention to be used to carry out maintenance in regions which are difficult to access between two flat, for example horizontal, surfaces. In this case, the chariot is moved and guided over a lower horizontal flat surface, as far as the maintenance region.

The invention applies not only to the field of the inspection and repair of nuclear reactors but also to the case of any maintenance operation in an industrial plant comprising regions that are difficult for operators to access or to which access is entirely impossible because of the presence of an inhospitable environment.

The clamping support may also consist of the movement carriage 4 itself, on which clamping rams are mounted.

The invention claimed is:

1. A maintenance device for working in a maintenance region of a plant delimited by at least one wall having at least two facing surfaces between which the maintenance work is performed and which is accessible from an introductory region of the plant, and comprising:
    a robot for carrying out the maintenance work in a remote-controlled or programmed way; and
    an immobilizing device for immobilizing a supporting part of the robot in the work position;
    a motorized and remote-controlled transport carriage;
    wherein the device for immobilizing the supporting part of the robot is a clamping support secured to the transport carriage includes at least two clamping shoes associated with movement means, each in at least one direction so as to move the shoe away from the clamping support, the movements of the two clamping shoes being performed in parallel and opposite directions; and
    keying means for quick fit keying the supporting part of the robot onto the motorized transport means;
    the robot being an anthropomorphic robot arm including elements mounted to rotate one with respect to another.

2. A device according to claim 1, wherein the clamping support comprises a support plate, a clamping shoe mounted so that it can move in a guide element perpendicular to the support plate on one side of the support plate, and two bearing shoes mounted so that they can move in a direction perpendicular to the support plate of the clamping support on an opposite side of the support plate to the side on which the clamping shoe is mounted, the clamping shoe and the bearing shoes each comprising a ram for movement in a direction perpendicular to the support plate of the clamping support, in a direction such that the clamping shoe and the bearing shoes are moved away from the support plate in opposite respective directions.

3. A device according to claim 1, wherein the clamping support includes an element for supporting the robot and comprising the quick-fit keying means for assembling the supporting element of the robot with the supporting element.

4. A Device according to claim 1, wherein a counterweight is fixed to an end part of the clamping support in a longitudinal direction of travel of the clamping chassis secured to the carriage.

5. A device according to claim 1, wherein a tool support is fixed to the clamping chassis to accommodate tools that the robot arm will pick up in order to carry out the maintenance work.

6. A device according to claim 1, wherein the transport carriage consists of a carriage comprising a support plate to which are fixed, in lateral arrangements, first and second wheelsets each comprising at least one wheel associated with a rotational drive motor.

7. A device according to claim 6, wherein each of the wheelsets of the carriage comprises a mechanical structure allowing the rotary mounting of the two wheels of the wheelset and the support of the motor driving one of the wheels of the wheelset, the mechanical structure of the wheelset being connected to the support plate by mechanical connecting elements.

8. A device according to claim 7, wherein the connecting elements connecting the wheelsets and the support plate of the carriage are produced in such a way as to be able to adjust the separation and the inclination of the wheelsets with respect to the support plate.

9. A device according to claim 8, wherein the mechanical structure of each of the wheelsets comprises two flat plates pierced with openings between which the wheels of the wheelsets are mounted to rotate and which are assembled with one another, one of the plates of the mechanical structure, or inner plate, supporting the motor that drives one of the wheels of the wheelsets.

10. A device according to claim 6, wherein the support plate of the carriage comprises openings for the mechanical attachment of a support plate of the clamping support in a superposed position.

\* \* \* \* \*